(12) United States Patent
Aguirre Hernandez et al.

(10) Patent No.: US 10,279,753 B1
(45) Date of Patent: May 7, 2019

(54) RETRACTABLE ELECTRONIC DEVICE HOLDER

(71) Applicant: FORD GLOBAL TECHNOLOGIES, LLC, Dearborn, MI (US)

(72) Inventors: Moises Aguirre Hernandez, Tecamac (MX); Leonardo Alonso Huitron, Naucalpan de Juarez (MX); Santiago Manuel Parra Becerra, Ocoyoacac. Col. Juarez los Chirinos (MX); David Kaleb Gonzalez Bojorges, Mexico City (MX)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/803,297

(22) Filed: Nov. 3, 2017

(51) Int. Cl.
| B60R 11/02 | (2006.01) |
| B60K 37/04 | (2006.01) |
| B60R 11/00 | (2006.01) |

(52) U.S. Cl.
CPC .......... *B60R 11/0241* (2013.01); *B60K 37/04* (2013.01); *B60R 11/0252* (2013.01); *B60R 2011/0005* (2013.01); *B60R 2011/0082* (2013.01)

(58) Field of Classification Search
USPC ..... 248/316.4, 316.1, 316.6, 213.41, 231.61, 248/229.22, 229.24
See application file for complete search history.

(56) References Cited

U.S. PATENT DOCUMENTS

| 5,187,744 | A | * | 2/1993 | Richter | B60R 11/0241 224/553 |
| 5,903,645 | A | * | 5/1999 | Tsay | B60R 11/0241 248/316.4 |
| 5,996,866 | A | | 12/1999 | Susko et al. | |
| 6,085,113 | A | * | 7/2000 | Fan | B60R 11/0241 379/426 |
| 6,158,793 | A | * | 12/2000 | Castro | B60R 11/02 224/548 |
| 6,366,672 | B1 | * | 4/2002 | Tsay | B60R 11/0241 379/446 |
| 6,464,281 | B2 | | 10/2002 | Volkmann et al. | |
| 7,062,300 | B1 | * | 6/2006 | Kim | B60R 11/0241 379/454 |
| 8,172,293 | B2 | | 5/2012 | Lota et al. | |
| 8,469,325 | B2 | * | 6/2013 | Yu | G10G 5/005 248/231.51 |
| 8,490,937 | B2 | * | 7/2013 | Crain | G01C 15/00 224/929 |
| 8,701,452 | B2 | * | 4/2014 | Foster | E05B 73/0082 248/316.1 |

(Continued)

FOREIGN PATENT DOCUMENTS

EP 2711246 B1 8/2015
WO 2017103848 A1 6/2017

*Primary Examiner* — Alfred J Wujciak
(74) *Attorney, Agent, or Firm* — Vichit Chea; King & Schickli, PLLC

(57) ABSTRACT

An apparatus is provided for holding an electronic device. That apparatus includes a telescoping ball joint support and a cradle carried on the telescoping ball joint support. The apparatus is displaceable between a stowed configuration and a deployed configuration. A related method of holding an electronic device adjacent a panel of a motor vehicle is also disclosed.

14 Claims, 8 Drawing Sheets

(56) References Cited

U.S. PATENT DOCUMENTS

| | | | | |
|---|---|---|---|---|
| 8,727,192 B2* | 5/2014 | Lai | ............... | B60R 11/0241 |
| | | | | 224/282 |
| 9,150,105 B2 | 10/2015 | Crepaldi et al. | | |
| 9,286,816 B2* | 3/2016 | Stanley | ............... | G09F 21/04 |
| 9,297,495 B2* | 3/2016 | Fischer | ............... | F16M 11/041 |
| 9,316,345 B2* | 4/2016 | Tarnay | ............... | F16M 11/14 |
| 9,453,522 B2* | 9/2016 | Yu | ............... | F16M 13/00 |
| 9,568,148 B2* | 2/2017 | Carnevali | ............... | B60R 11/0241 |
| 2003/0034429 A1* | 2/2003 | Carnevali | ............... | B60R 11/02 |
| | | | | 248/346.07 |
| 2006/0278788 A1* | 12/2006 | Fan | ............... | B60R 11/02 |
| | | | | 248/309.1 |
| 2009/0173863 A1* | 7/2009 | Crown | ............... | B60R 11/0241 |
| | | | | 248/316.4 |
| 2011/0121148 A1* | 5/2011 | Pernia | ............... | B60R 11/0229 |
| | | | | 248/207 |
| 2012/0126083 A1* | 5/2012 | Nemoto | ............... | B60R 11/02 |
| | | | | 248/316.4 |
| 2012/0312936 A1* | 12/2012 | Huang | ............... | F16M 11/041 |
| | | | | 248/122.1 |
| 2013/0292524 A1* | 11/2013 | Canivell Grifols | ... | A47F 7/0028 |
| | | | | 248/121 |
| 2015/0283950 A1 | 10/2015 | Backman et al. | | |
| 2016/0257260 A1 | 9/2016 | Barre et al. | | |
| 2017/0217381 A1 | 8/2017 | Gilling et al. | | |

\* cited by examiner

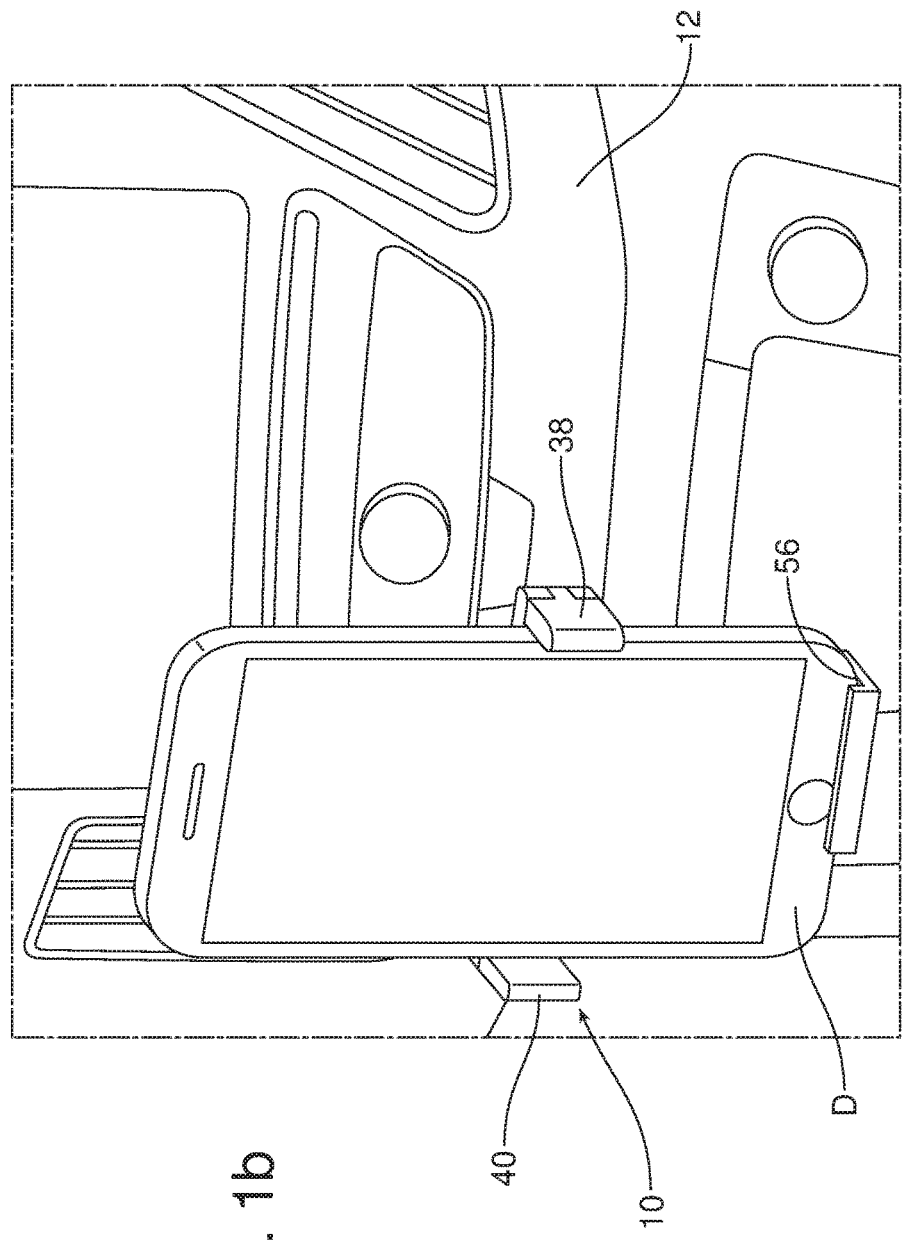

RETRACTABLE ELECTRONIC DEVICE HOLDER

TECHNICAL FIELD

This document relates generally to the motor vehicle equipment field and, more particularly, to an apparatus for holding an electronic device that may be retracted when not in use and effectively concealed behind a panel of a motor vehicle.

BACKGROUND

A number of after-market devices are available for holding electronic devices, such as smart phones, at convenient locations along the door panel, the dashboard or the center console of a motor vehicle. While such devices are useful for their intended purpose, they do suffer from a number of shortcomings. Typically, these devices are of a "one size fits all" design that may not be particularly suited for use in the particular model of motor vehicle in which it will be used. Additionally, when these devices are not in use, they are typically quite unsightly. Accordingly, when not in use they must be stowed in the glove compartment, center console storage compartment, a door map pocket, under a seat or at another location. The devices must then be retrieved and deployed once again the next the time they are needed. This can be very inconvenient and annoying for the user.

This document relates to a new and improved apparatus for holding an electronic device which is an integral part of the original equipment of the motor vehicle. Advantageously, the apparatus may be easily deployed for use and easily stowed out of sight, effectively concealed behind a panel of a motor vehicle when not in use.

SUMMARY

In accordance with the purposes and benefits described herein, an apparatus is provided for holding an electronic device at an accessible and useful position. That apparatus comprises a telescoping ball joint support and a cradle carried on the telescoping ball joint support. As will become apparent in the following description, the apparatus is displaceable between a stowed configuration and a deployed configuration.

The cradle may include a base and an easel carried on the base. A pivot may be provided connecting the easel to the base whereby the easel may be pivoted with respect to the base between a first position when the apparatus is in the stowed configuration and a second position when the apparatus is in a deployed configuration. The base may also include a clamping feature to engage and positively hold or retain the electronic device on the easel.

That clamping feature may comprise a first jaw and a second jaw. The first jaw may be mounted by a first pivot to the base. The base may include a guide track and the second jaw may be mounted by a second pivot to a rail that slides along that guide track. Such a configuration allows span adjustment. More specifically, the second jaw may be position adjusted with respect to the first jaw in order to accommodate and hold any electronic device within a given size range. This allows the apparatus to accommodate different makes and sizes of electronic devices. Advantageously, the easel may include a channel to receive and hold the electronic device in a position at an angle where it may be easily viewed.

The telescoping ball joint support may include a telescoping arm and a ball carried on a distal end of the telescoping arm. Further, the telescoping ball joint support may include a socket carried on the base. The socket holds the ball and allows the cradle to be position adjusted when in the deployed configuration.

In accordance with an additional concept, a method is provided of holding an electronic device adjacent to a trim panel of a motor vehicle. That method comprises the steps of: (a) pulling a cradle from the panel, (b) positioning the electronic device on an easel of the cradle and (c) securing the electronic device on the easel with a clamping feature carried on the cradle.

The method may further include the step of supporting the cradle on a telescoping ball joint. The method may include the step of adjusting a use position of the cradle by manipulating a ball joint of the telescoping ball joint support when the cradle is deployed from the panel. The step of deploying a cradle may include pivoting an easel with respect to a base from a first position to a second position.

Still further, the step of securing the electronic device with the clamping feature may include the steps of: (a) pivoting a first jaw of the clamping feature into a first clamping position, (b) pivoting a second jaw of the clamping feature into a second clamping position and (c) displacing the second jaw with respect to the first jaw until the electronic device is squeezed between the first jaw and the second jaw. In this way it is possible to positively hold the electronic device in the desired position on the cradle against foreseeable acceleration, deceleration and cornering forces produced during motor vehicle operation.

Still further, the method may include the step of removing the electronic device from the cradle. The method may also include the step of pivoting the easel from the second position to the first position as well as the step of returning the first jaw and the second jaw to a stowed position. Still further, the method may include the step of returning the cradle to a stowed configuration effectively concealed within the panel following use of the apparatus.

In the following description, there are shown and described several preferred embodiments of the apparatus for holding an electronic device and the related method of holding an electronic device adjacent a panel such as a trim panel of a motor vehicle. As it should be realized, the apparatus and method are capable of other, different embodiments and their several details are capable of modification in various, obvious aspects all without departing from the apparatus and method as set forth and described in the following claims. Accordingly, the drawings and descriptions should be regarded as illustrative in nature and not as restrictive.

BRIEF DESCRIPTION OF THE DRAWING FIGURES

The accompanying drawing figures incorporated herein and forming a part of the specification, illustrate several aspects of the apparatus and method and together with the description serve to explain certain principles thereof.

FIG. 1b is a view similar to FIG. 1a but illustrating the apparatus in the deployed configuration, holding an electronic device at an easily accessed and viewed position.

FIG. 2a illustrates the apparatus in the stowed configuration with the telescoping ball joint support fully retracted and the distal end of the cradle flush with the center stack trim panel.

FIG. 2b is a view similar to FIG. 2a but illustrating the apparatus in a partially deployed position with the telescoping ball joint support in the extended position and the cradle being pivoted from the first position to the second position.

FIG. 2c is a detailed perspective schematic view illustrating the jaws of the clamping device folded inward.

FIGS. 2d and 2e illustrate the jaws of the clamping feature folded outward to accept and hold an electronic device as well as the guide track and cooperating rail that allow for span adjustment of the clamping feature to accommodate electronic devices of different size and shape.

FIG. 2f illustrates an electronic device held on the easel of the cradle and positively maintained in position by the clamping feature.

Reference will now be made in detail to the present preferred embodiments of the apparatus for holding an electronic device, examples of which are illustrated in the accompanying drawing figures.

DETAILED DESCRIPTION

Figure 1A:
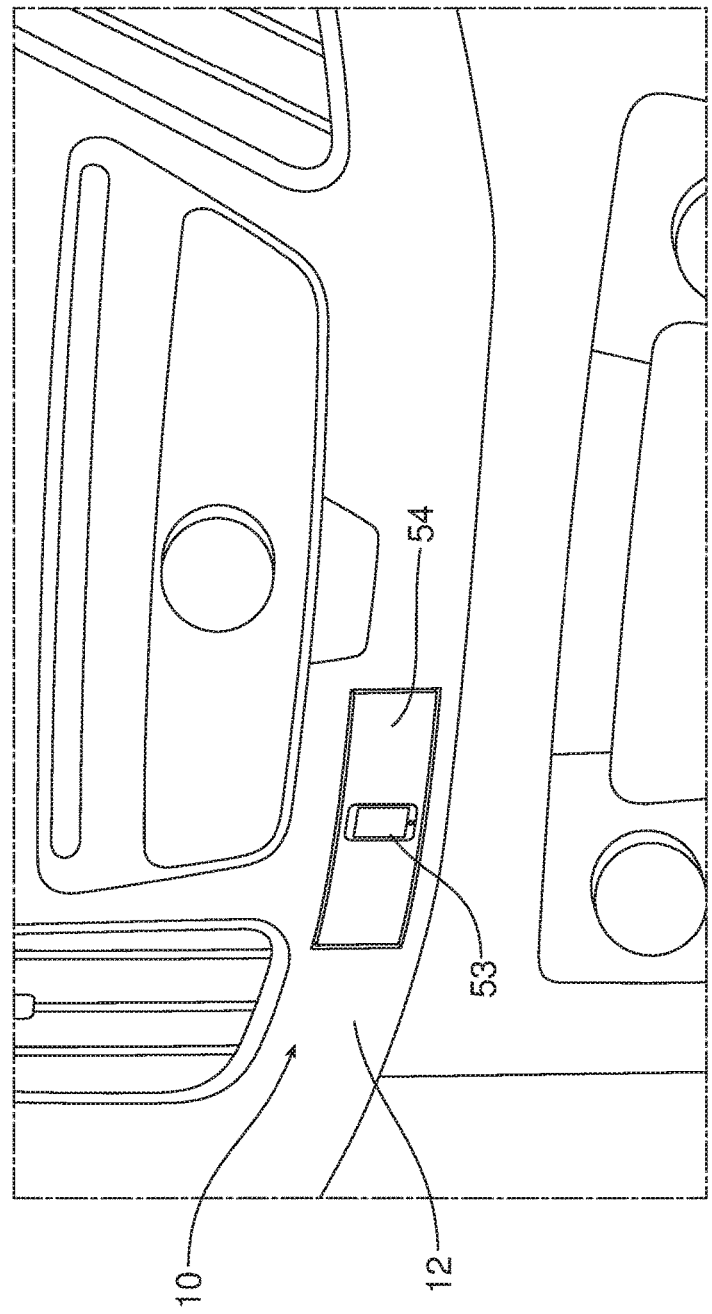
FIG. 1a is a perspective view of the apparatus for holding an electronic device integrated into the center stack of a motor vehicle wherein the device is illustrated in the stowed configuration.

Reference is now made to the drawing FIGS. 1a, 1b, and 2a-2f which illustrate the new and improved apparatus 10 for holding an electronic device D at an easily accessible and viewed position adjacent a trim panel 12 of a motor vehicle. As illustrated in FIGS. 1a and 1b, that trim panel 12 is part of the center stack. FIG. 1a illustrates the apparatus 10 in a stowed configuration effectively or substantially concealed behind the trim panel 12. FIG. 1b illustrates the apparatus 10 in a deployed configuration holding the electronic device D.

As best illustrated in FIGS. 2a-2f, the apparatus 10 may be generally described as including a telescoping ball joint support 14 and a cradle 16 carried on the telescoping ball joint support. In the illustrated embodiment, the telescoping ball joint support 14 includes a telescoping arm 18 having a first segment 20, a second segment 22 and a third segment 24. The proximal end 26 of the first segment 20 may be fixed behind the trim panel 12 to a support or other structure (not shown). A ball 28 is carried on the distal end of the telescoping arm 18/the distal end of the third segment 24.

Figure 2A:
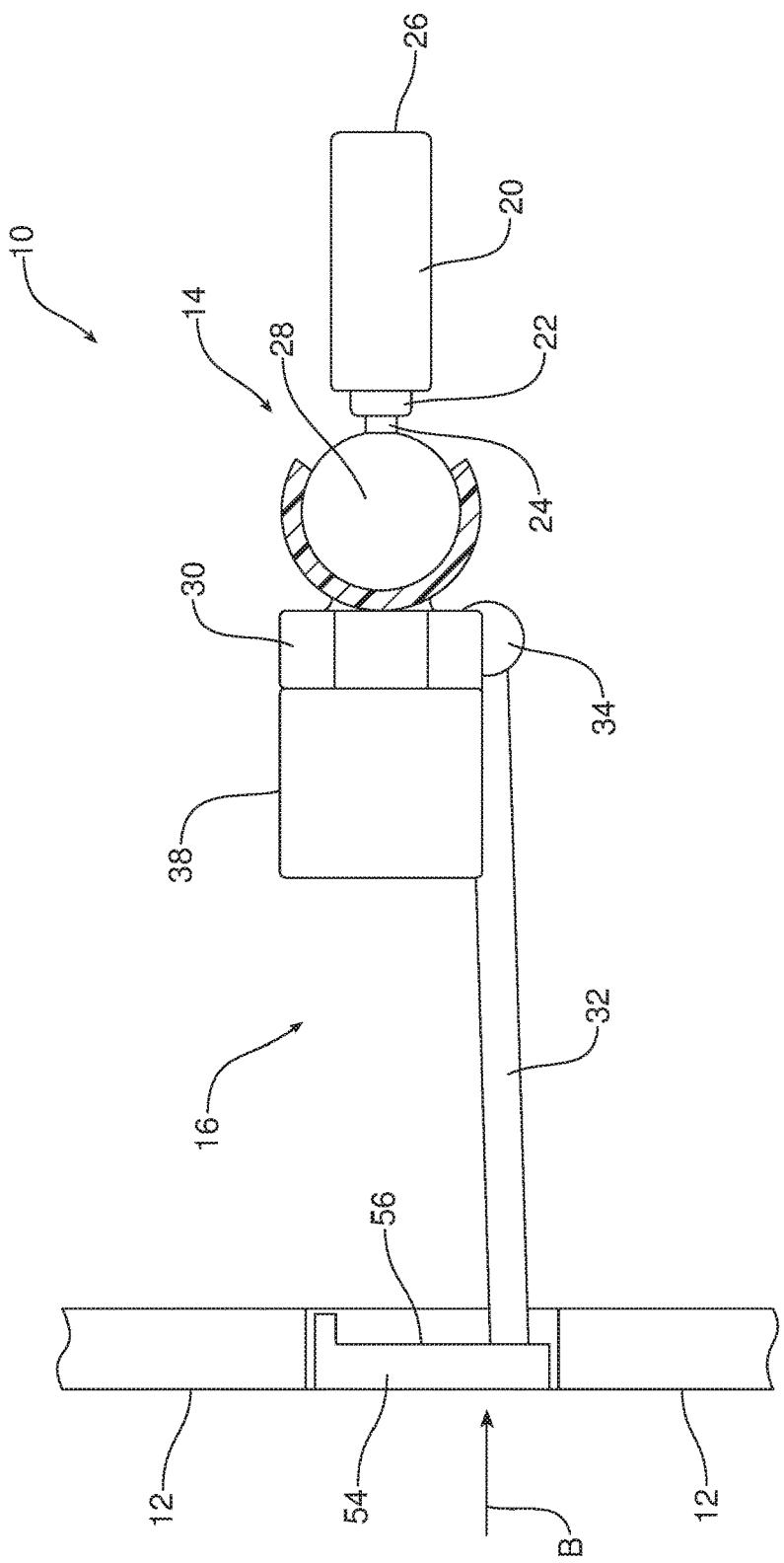
FIGS. 2a-2f are a series of views illustrating the displacement of the apparatus from the stowed configuration to the deployed configuration.
Figure 2B:
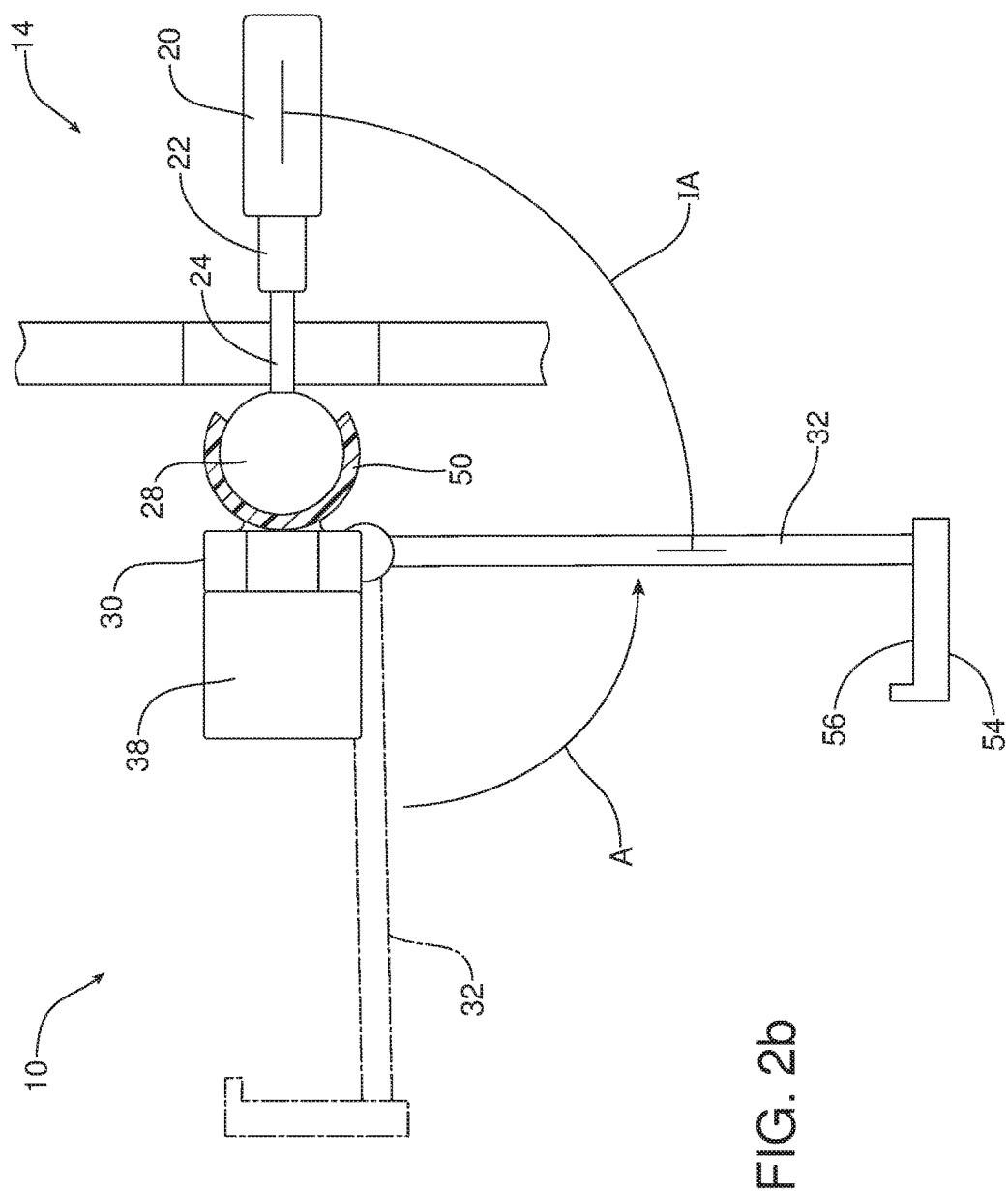

In the illustrated embodiment, the cradle 16 includes a base 30 and an easel 32. In the illustrated embodiment, the easel 32 is pivotally connected to the base 30 by a hinge or pivot 34. The pivot 34 allows the easel 32 to be pivoted (note action arrow A in FIG. 2b) with respect to the base 30 between a first position and a second position. As illustrated in FIG. 2a, when the easel 32 is in the first position, the easel 32 extends substantially parallel with the telescoping arm 18. However, when the easel 32 is in the second position, the easel 32 extends to form an included angle relative to the longitudinal axis of the telescoping arm 18 of between, for example, 90 degrees and 170 degrees and, more particularly, of between about 90 degrees and about 120 degrees. FIG. 2b illustrates the easel 32 in the first position in phantom line and in the second position in full line. The included angle defined between the easel 32 and the telescoping arm 18 is illustrated at IA.

Figure 2C:
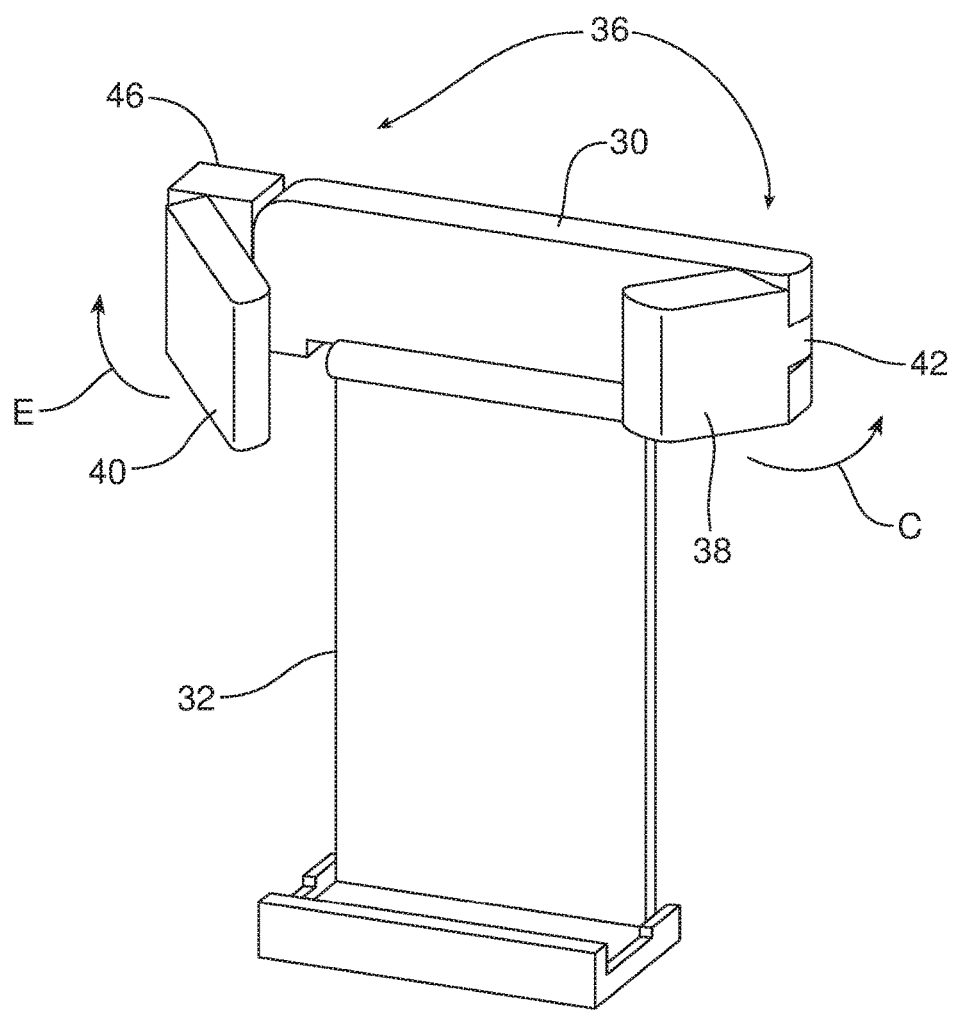
Figure 2D:
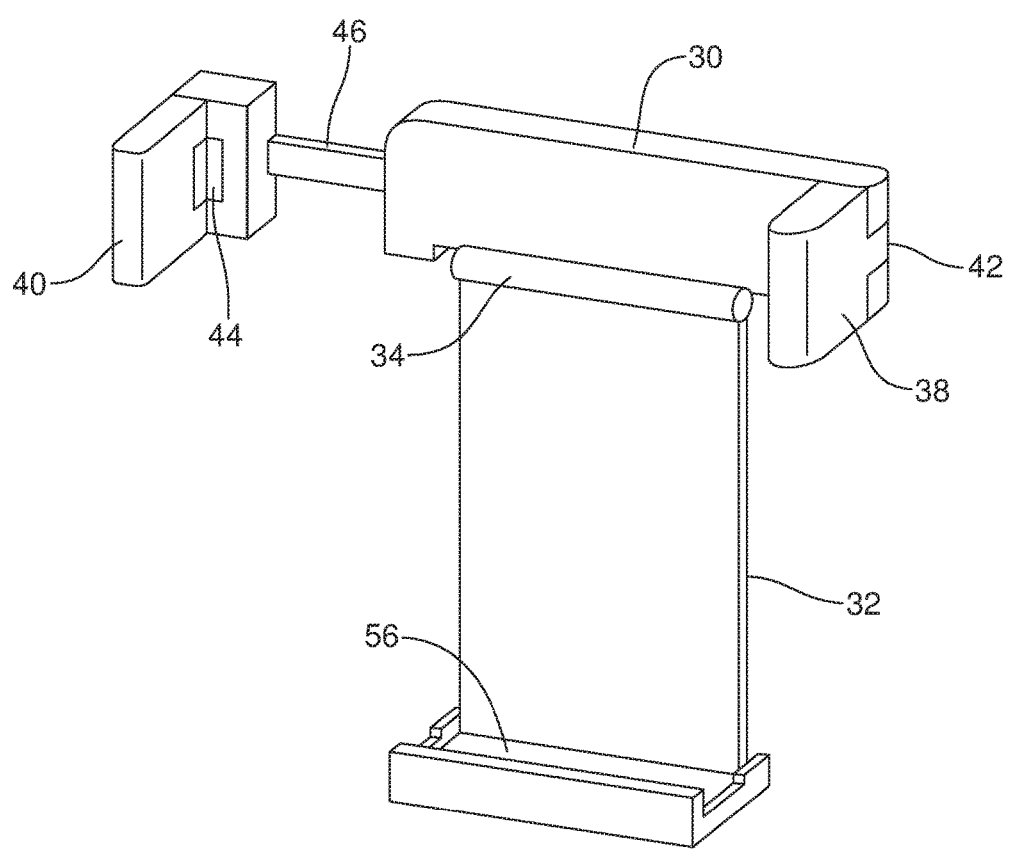
Figure 2E:
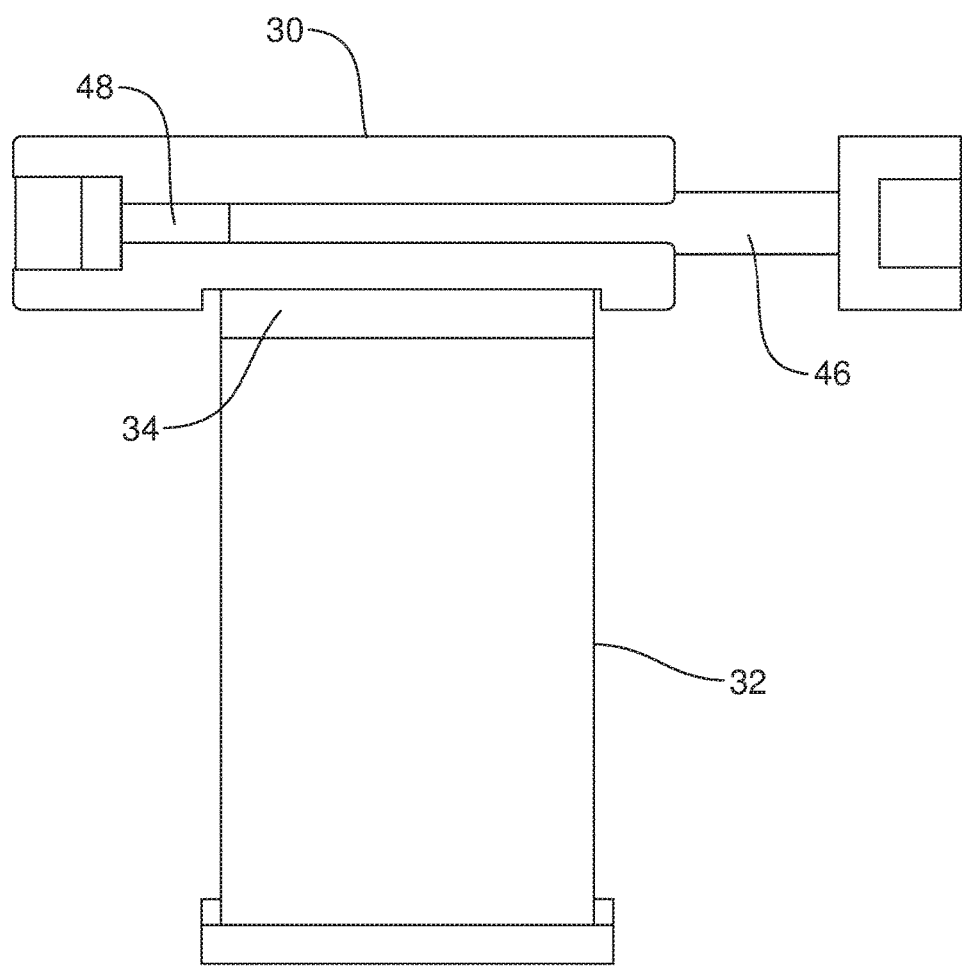
Figure 2F:
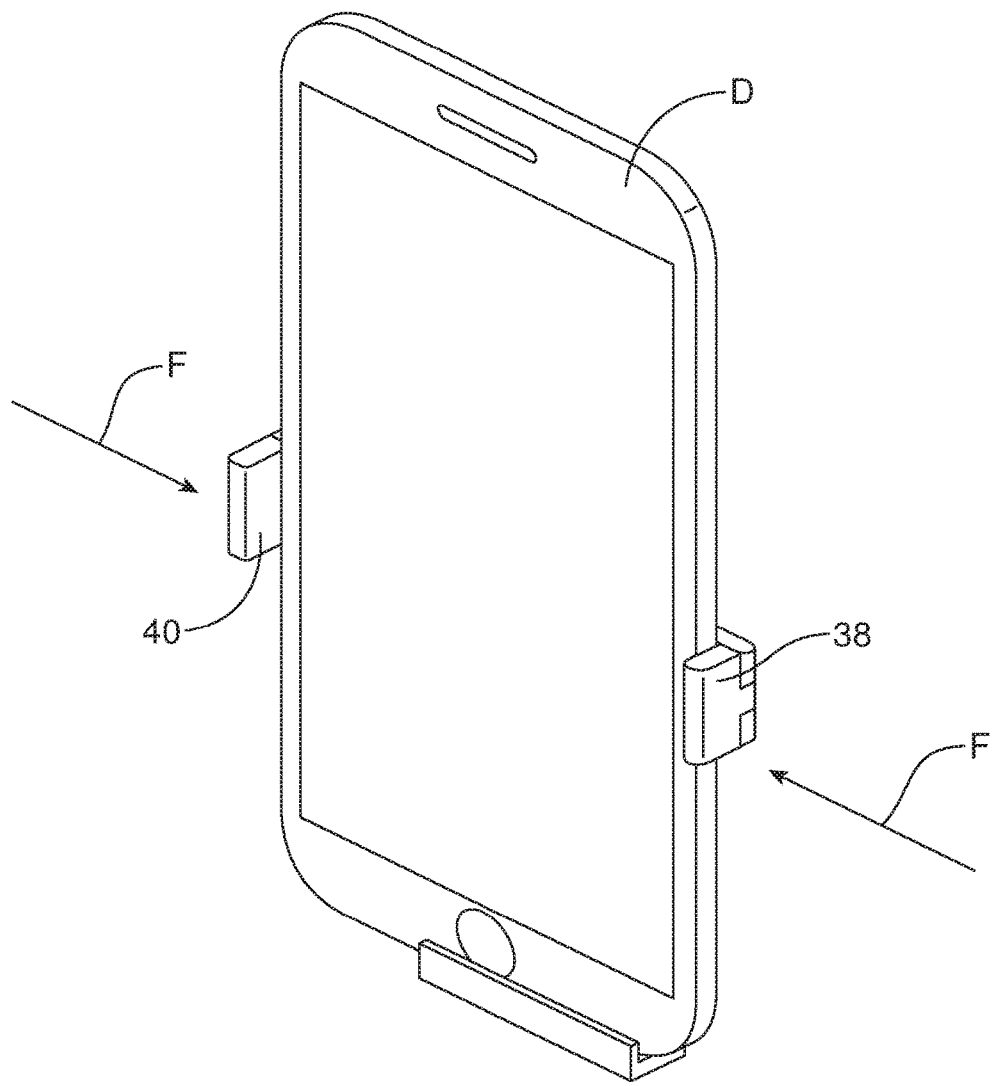

As best illustrated in FIGS. 2c-2e, the base 30 also includes a clamping feature generally designated by reference numeral 36, to engage and hold the electronic device D when the electronic device is resting on the easel 32. In the illustrated embodiment, the clamping feature 36 includes a first jaw 38 and a second jaw 40. As illustrated, the first jaw 38 is mounted by a first pivot 42 to the base 30. The second jaw 40 is mounted by a second pivot 44 to a rail 46. Rail 46 slides along a guide track 48 provided in the base 30. This configuration allows one to adjust the span of the clamping feature 36 by adjusting the position of the second jaw 40 with respect to the first jaw 38 in order to accommodate and hold electronic devices D of different size and shape.

The telescoping ball joint support 14 also includes a socket 50 carried on the base 30. The socket 50 engages and holds the ball 28 on the distal end of the telescoping arm 18 while allowing the cradle 16 to be position adjusted through a wide range of angles when in the deployed configuration.

The apparatus 10 is useful in a method of holding an electronic device D adjacent a panel 12 of a motor vehicle. That method may be described as including the steps of: (a) deploying the cradle 16 from the trim panel 12, (b) positioning the electronic device D on the cradle 16 and (c) securing the electronic device on the cradle with the clamping feature 36 carried on the cradle. More specifically, the apparatus 10 is illustrated in the stowed position in FIG. 1a. An appropriate icon 52 of, for example, a phone may be provided on the end 54 of the cradle 16. In one possible embodiment, the end 54 of the cradle 16 fits flush with the trim panel 12 when stowed. Further, the apparatus 10 may include a push-push latch (not shown). In such an embodiment, one would depress the end 54 of the cradle 16 (note action arrow B in FIG. 2a) and release to cause the apparatus 10 to pop out from the trim panel 12. In other possible embodiments, the end 54 of the cradle 16 may include a knob or other finger hold allowing one to simply pull the apparatus 10 from the trim panel 12 so as to displace the cradle from the stowed position illustrated in FIG. 2a to the partially deployed position illustrated in FIG. 2b projecting from the trim panel 12.

The step of deploying the cradle 16 also includes pivoting the easel 32 with respect to the base 30 on the pivot or hinge 34 from the first position illustrated in phantom line in FIG. 2b to the second position illustrated in full line in FIG. 2b.

The positioning of the electronic device D on the cradle 16 may include the steps of pivoting the first jaw 38 of the clamping feature 36 about the first pivot 42 into a first clamping position (note action arrow C in FIG. 2c) and pivoting the second jaw 40 about the second pivot 44 into a second clamping position (note action arrow E in FIG. 2c). After positioning the electronic device D on the easel 32 with the bottom edge of the electronic device held in the channel 56, the securing of the electronic device with the clamping feature 36 may include the further step of displacing the second jaw 40 with respect to the first jaw 38 until the electronic device is squeezed between the first and second jaws (note action arrows F in FIG. 2f).

The method may also include pivoting the cradle 16 on the telescoping ball joint support 14 or, in other words, adjusting a use position of the cradle 16 and the electronic device D held thereon by manipulating the ball joint 28, 50 of the telescoping ball joint support 14 when the cradle 16 is deployed from the panel 12. Advantageously, the telescoping ball joint support 14 provides for a wide range of angular adjustment thereby allowing the user to position the electronic device D at a desired position and at a desired angle for best access and viewing convenience.

Following use, the method includes removing the electronic device D from the cradle 16. This is followed by the pivoting of the easel 32 about the hinge or pivot 34 from the second position to the first position wherein the cradle is longitudinally aligned with the telescoping arm 18. If desired, the operator may also return the first jaw 38 and the second jaw 40 to the stowing positions where they are folded inward as illustrated in FIG. 2c. This may be followed by the step of returning the apparatus 10, and more particularly the cradle 16 to the stowed configuration where the cradle is effectively concealed within the trim panel 12 with only the end 54 and icon 52 visible (see FIGS. 1a and 1b).

The foregoing has been presented for purposes of illustration and description. It is not intended to be exhaustive or to limit the embodiments to the precise form disclosed. Obvious modifications and variations are possible in light of the above teachings. For example, while the apparatus 10 is illustrated and described above as being associated with or integrated into a trim panel 12 along the center stack, it should be appreciated that the apparatus could be associated or integrated into substantially any desired trim panel or structure within the interior of the motor vehicle. All such modifications and variations are within the scope of the appended claims when interpreted in accordance with the breadth to which they are fairly, legally and equitably entitled.

What is claimed:

1. An apparatus for holding an electronic device in a motor vehicle, comprising:
    a trim panel;
    a telescoping ball joint support;
    a cradle carried on said telescoping ball joint support wherein said cradle includes a base and an easel carried on said base and said apparatus is displaceable between a stowed configuration, wherein said telescoping ball joint support is concealed inside said trim panel, and a deployed configuration; and
    a pivot connecting said easel to said base whereby said easel is pivoted with respect to said base between a first position and a second position.

2. The apparatus of claim 1, wherein said base includes a clamping feature to engage and hold the electronic device on said easel.

3. The apparatus of claim 2, wherein said clamping feature comprises a first jaw and a second jaw.

4. The apparatus of claim 3, wherein said first jaw is mounted by a first pivot to said base.

5. The apparatus of claim 4, wherein said base includes a guide track and said second jaw is mounted by a second pivot to a rail that slides along said guide track whereby said second jaw is adjustable with respect to said first jaw in order to accommodate and hold the electronic device of a given size.

6. The apparatus of claim 5, wherein said easel includes a channel to receive and hold the electronic device.

7. The apparatus of claim 6, wherein said telescoping ball joint support includes a telescoping arm and a ball carried on a distal end of said telescoping arm.

8. The apparatus of claim 7, wherein said telescoping ball joint support further includes a socket carried on said base, said socket holding said ball and allowing said cradle to be position adjusted when in said deployed configuration.

9. A method of holding an electronic device adjacent a trim panel of a motor vehicle, comprising:
    deploying a cradle, carried on a telescoping ball joint support, from a stowed configuration wherein said telescoping ball joint support is concealed inside said trim panel;
    pivoting said cradle on said telescoping ball joint support;
    adjusting a use position of said cradle by manipulating a ball joint of said telescoping ball joint support when said cradle is deployed from said panel;
    positioning the electronic device on said cradle; and
    securing the electronic device on said cradle with a clamping feature carried on said cradle, wherein deploying said cradle includes pivoting an easel with respect to a base from a first position to a second position.

10. The method of claim 9, wherein securing the electronic device with said clamping feature includes pivoting a first jaw of said clamping feature into a first clamping position, pivoting a second jaw of said clamping feature into a second clamping position and displacing said second jaw with respect to said first jaw until the electronic device is squeezed between said first jaw and said second jaw.

11. The method of claim 10, including removing the electronic device from said cradle.

12. The method of claim 11, including pivoting said easel from said second position to said first position.

13. The method of claim 12, including returning said first jaw and said second jaw to a stowing position.

14. The method of claim 13, including returning said cradle to a stowed configuration concealed within said panel.

* * * * *